Figure 1:
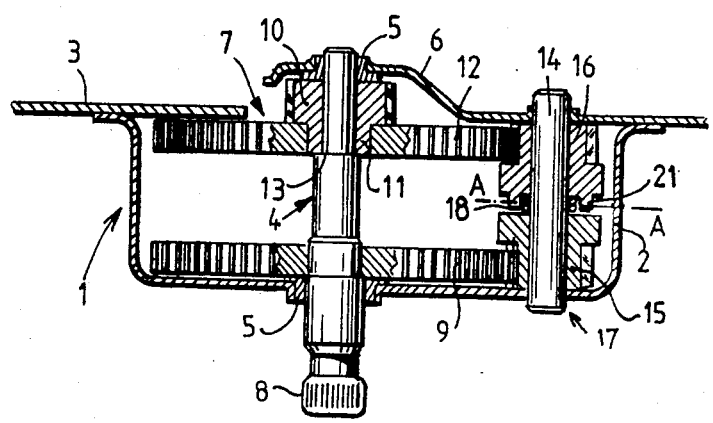

United States Patent [19]

Periou

[11] Patent Number: 4,683,995

[45] Date of Patent: Aug. 4, 1987

[54] ACTUATING DEVICE IN PARTICULAR FOR A VEHICLE WINDOW GLASS RAISING DEVICE

[75] Inventor: Pierre Periou, Cergy Pontoise, France

[73] Assignee: Compagnie Industrielle De Mecanismes en abrege C. I. M., France

[21] Appl. No.: 830,784

[22] Filed: Feb. 19, 1986

[30] Foreign Application Priority Data

Feb. 27, 1985 [FR] France .............................. 85 02855

[51] Int. Cl.⁴ ...................... F16D 49/02; F16H 57/10
[52] U.S. Cl. .................................. 192/8 C; 49/348; 74/411.5
[58] Field of Search .......................... 192/8 C, 8 R, 7; 49/348, 350, 351, 353; 74/411.5, 414

[56] References Cited

U.S. PATENT DOCUMENTS

| | | | |
|---|---|---|---|
| 2,001,758 | 5/1935 | Zwierzina | 192/8 C X |
| 3,280,509 | 10/1966 | Werner | 192/8 C X |
| 3,554,337 | 1/1971 | Denkowski | 192/8 R |

*Primary Examiner*—Rodney H. Bonck

[57] ABSTRACT

The actuating device comprises a mechanism for displacing the window glass in translation including a gear pinion (10) freely rotatively mounted on a driving shaft (4), the pinion (10) being connected to the driving shaft through an auto-lock mechanism (17), there being interposed between the auto-lock mechanism, on one hand, and the driving shaft and the pinion of the displacing mechanism, on the other hand, respectively a device (9, 15) for accelerating the effect of the release of the auto-lock mechanism under the action of the driving shaft, and a device (12, 16) for accelerating the effect of the locking of the auto-lock mechanism under the action of the pinion of the glass displacing mechanism. This actuating device is intended in particular for vehicle window glass raising devices.

7 Claims, 2 Drawing Figures

ACTUATING DEVICE IN PARTICULAR FOR A VEHICLE WINDOW GLASS RAISING DEVICE

The present invention relates to an actuating device provided with an auto-lock mechanism, in particular for a window glass raising device.

In a glass raising device of this type actuated manually, the actuating device directly cooperates with the actuating lever, on one hand, and the mechanism for displacing the glass in translation, on the other hand. In these devices, the known auto-lock mechanisms are formed by a bell-shaped element fixed to the door of the vehicle and against the inner wall of which element is placed a spiral spring having, in the released state, a diameter exceeding the inside diameter of this element. The latter has an opening through which the shaft of the actuating lever extends, this shaft having two lugs cooperating with inwardly radially bent end portions of the spiral spring so as to reduce its diameter. The driving gear pinion of the mechanism for shifting the glass also includes lugs cooperating with the ends of the spiral spring but in a manner to increase the diameter of the latter. The alternating disposition of these lugs also permits the coupling of the shaft on the lever and the driving pinion.

Such actuating devices have a major drawback in that the play resulting from the auto-lock mechanism results in a lost or inoperative travel of the shaft of the lever through an angle whose value cannot be reduced below 40° in a practical manner.

An object of the invention is to overcome the aforementioned drawbacks of the known devices by providing an actuating device which has a reduced inoperative travel and ensures an improved locking and release of the glass raising device.

Another object of the invention is to provide a glass raising device comprising an improved auto-lock mechanism which is easier to construct and has a cost price lower than those of the prior art.

The invention therefore provides an actuating device, in particular for a vehicle window glass raising device, comprising means for displacing the glass in translation including a gear pinion freely rotatively mounted on a driving shaft, said pinion being connected to said shaft through an auto-lock mechanism, wherein there are interposed between the auto-lock mechanism and the driving shaft and pinion respectively, means for accelerating the effect of the release of the auto-lock mechanism under the action of the driving shaft, and means for accelerating the locking effect of said mechanism under the action of the pinion of the glass displacing means.

According to a particular feature of the invention, the actuating device of the aforementioned type is so arranged that the auto-lock mechanism is formed by a pin which is fixed in a position parallel to the driving shaft and on which is mounted a spiral spring whose end portions are each interposed between axial portions of two gear pinions freely mounted on said pin.

Figure 2:
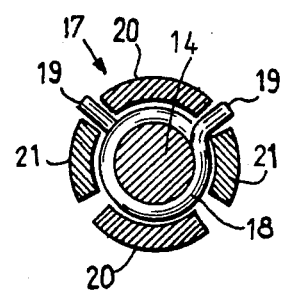

Further features and advantages of the invention will be apparent from the following description which is given merely by way of example with reference to the accompanying drawings, in which:

FIG. 1 is a sectional view of an actuating device according to the invention, and FIG. 2 is a sectional view taken on line A—A of FIG. 1.

FIG. 1 shows an actuating device 1 for means for displacing a window glass (not shown) in translation. Generally, these displacing means are of the type having a toothed sector, a rack or other type which is driven by a driving gear pinion. As these means are known, they will not be described in more detail.

The actuating device comprises a cover 2 fixed to a metal sheet 3 of a door of the vehicle (not shown). A driving shaft 4 is rotatively mounted in bearings 5 of rubber or the like, respectively disposed in openings provided in the cover and in the part 6 of the sheet 3 which is cut out and deformed inwardly of the door so as to provide a passage 7 for a toothed sector or a rack (not shown). The shaft 4 extends outwardly of the cover 2 and its end portion 8 has splines for the fixing of an actuating lever (not shown).

Keyed on the shaft 4 and disposed inside the cover 2 is a first gear wheel 9 which bears against the bearing provided on the cover. Freely mounted on the shaft 4 is a driving gear pinion 10 which bears against the bearing provided in the part 6. This pinion 10 has a cylindrical extension 11 on which a second gear wheel 12 is keyed, this gear wheel bearing against an annular shoulder 13 of the shaft 4. Consequently, the shaft 4 is held axially in position. A pin 14 parallel to the shaft 4 is fixed in openings provided in the cover and the metal sheet 3. A first gear pinion 15 and a second gear pinion 16 are freely rotatively mounted on the pin 14 in such manner as to engage the first gear wheel 9 and second gear wheel 12 respectively so as to constitute respectively means 9, 15 for accelerating the releasing effect of an auto-lock mechanism 17, and means 12, 16 for accelerating the locking effect of this mechanism.

As shown in FIG. 2, this auto-lock mechanism further comprises a spiral spring 18, preferably having a diameter less than the diameter of the pin 14 and mounted on this pin. The end portions 19 of the spring are bent so as to extend radially outwardly and cooperate with first lugs 20 formed on the first pinion 15 and second lugs 21 formed on the second pinion 16. Note that one of the lugs 20 does not cooperate with the end portions 19 but is formed for reasons of facility of manufacture.

With such an actuating device, when the lever (not shown), and consequently the shaft 4, is turned in one direction or the other, the pinion 15 is driven in rotation through the first gear wheel 9. The lug 20 exerts a thrust on either one of the end portions 19 and simultaneously the lugs 21 and the spiral spring then comes away from the pin 14 so that it releases the pinions and allows them to rotate freely. The pinion 15 drives the gear wheel 12 and the driving pinion 10 which drives the sector or rack of the glass displacing mechanism so as to raise or lower the glass.

If the glass is pushed downwardly or pulled upwardly, the resulting force is transmitted to the pinion 16 and either one of its lugs 21 bears against the corresponding end portion of the spring. The spring grips the pin 14 and thus opposes the rotation of the pinions 15 and 16 and consequently opposes the displacement of the glass.

With such a device, it is possible to reduce the inoperative travel of the shaft of the lever, or play due to the auto-lock mechanism and to increase and accelerate the locking or releasing effect of the latter. Advantageously, the transmission ratio between the gear wheel 9 and the gear pinion 15 is 5 and the transmission ratio between the gear pinion 16 and the gear wheel 12 is 1/5.

Owing to this choice of the transmission ratios of the means for accelerating the releasing and locking effects, the inoperative travel of the driving shaft, and consequently the lever, can be reduced to an angle of less than 10°.

It must be understood that the scope of the invention is not intended to be limited to the described embodiment and that many modifications may be made without departing from the scope of the invention defined in the appended claims. In particular, it is possible to use for the transmission means instead of gear wheel-gear pinion assemblies, assemblies comprising pulleys and toothed bolts or the like. It will be understood that the invention is applicable to any type of mechanism providing an auto-locking of rotation of known type.

What is claimed is:

1. An actuating device for raising and lowering a vehicle window glass comprising:
    a driving shaft,
    a drive gear pinion mounted for rotation on the driving shaft,
    an auto-lock mechanism connected to said pinion and to said driving shaft, comprising a pin fixed in position to be parallel to said drawing shaft, a first gear pinion, a second gear pinion freely mounted on said pin, and a spring mounted on said pin having end portions which are each interposed between axial portions of said first and second gear pinions,
    means for releasing said auto-lock mechanism under the action of the driving shaft, and
    means for locking the auto-lock mechanism under the action of the drive gear pinion.

2. A device according to claim 1 wherein the releasing and locking means comprise respectively one of said first and second gear pinions cooperating with a first gear wheel keyed on the driving shaft and the other of said first and second gear pinions cooperating with a second gear wheel keyed on the drive gear pinion.

3. A device according to claim 2, wherein a first transmission ratio in the direction from the first gear wheel to the corresponding gear pinion is higher than 1 and a second transmission ratio in the direction from the other gear pinion to the second gear wheel is lower than 1.

4. A device according to claim 3, wherein the first and second gear wheels are identical and the two gear pinions are identical.

5. A device according to claim 4, wherein the first transmission ratio is equal to 5.

6. A device according to claim 1, wherein the axial portions of the two gear pinions are alternating pairs of lugs.

7. A device according to claim 1, wherein the spring has, in the released state, a diameter which is no more than the diameter of the pin.

* * * * *